Patented June 13, 1950

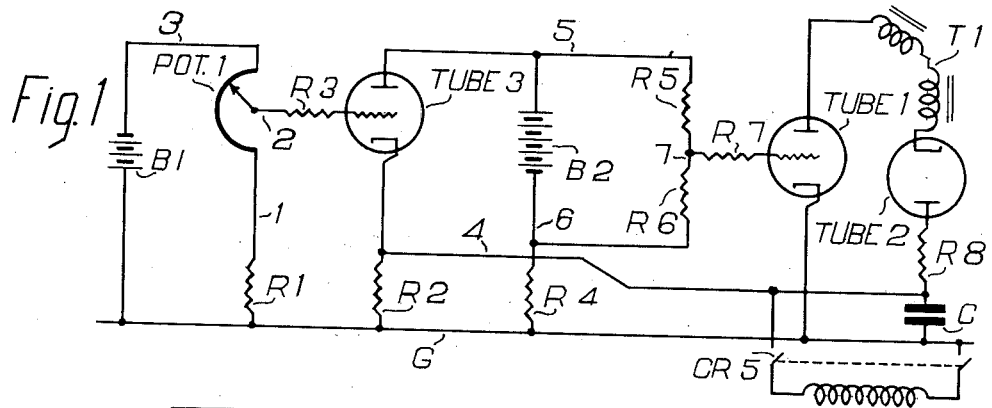
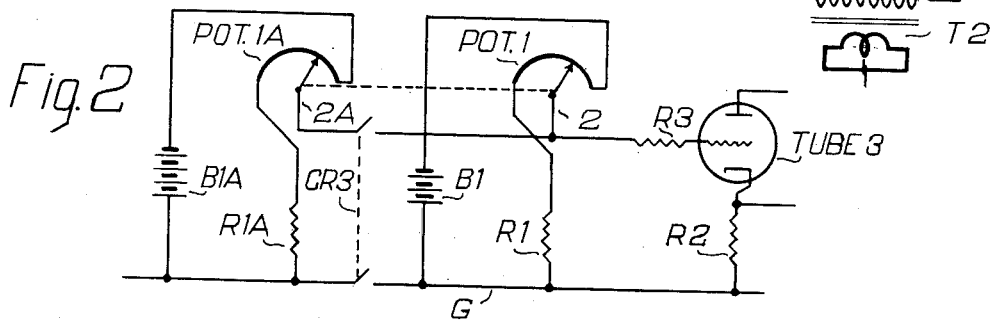
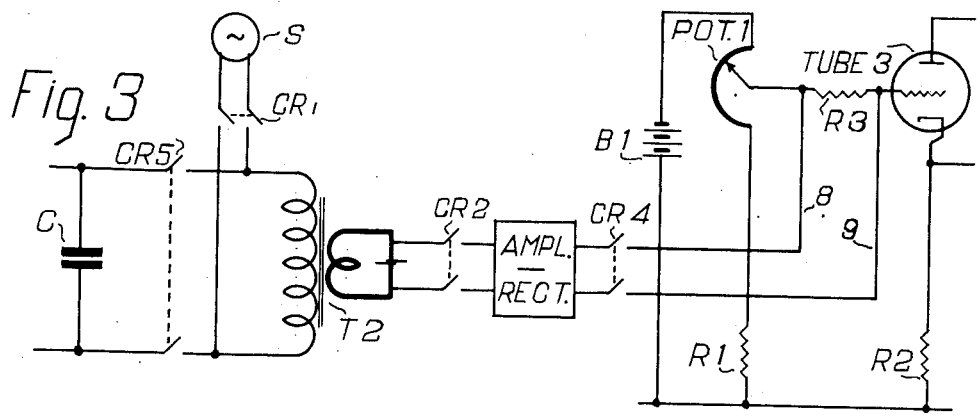

2,510,956

UNITED STATES PATENT OFFICE 2,510,956

RESISTANCE WELDING METHOD

Jesse J. Brown, Stratford, Conn.

Application May 14, 1947, Serial No. 748,005

11 Claims. (Cl. 219—10)

This invention relates to spotwelding, more particularly to the spotwelding of aluminum alloys, and to the welding of ferrous materials which may affect the impedance of the secondary of the welding transformer.

The principal object of the invention is to improve the quality and the consistency of spotwelding aluminum by varying the energy input to each individual spotweld in accordance with the electrical resistance of the contact between the faying surfaces of the work at that point.

Another object is to compensate for the bypassing or shunting of a portion of the welding current thru adjacent previously made welds.

Another object is the elimination of the need for cleaning the aluminum.

Still another object is to compensate for the varying effects of ferrous materials when of necessity they are positioned within the throat of the welding machine, when welding such materials.

In welding aluminum, its extremely low electrical resistance, high thermal conductivity, narrow plastic temperature range, and widely varying oxide coating, combine to make high quality welding, with any degree of consistency, very difficult. Removing the oxide coating and cleaning the surfaces so as to obtain uniform resistance over the area to be welded, is also very difficult and constitutes one of the major problems in the quality spotwelding of aluminum. The usual practice in preparing the surface is to completely remove the oxide coating by either mechanical or chemical means, but the resulting resistances of the surfaces, when pressed together for welding, are never satisfactorily uniform.

In spotwelding sheets of aluminum together, more difficulty is experienced with the resistance of the faying surfaces contact than with the contacts between the copper welding electrode tips and the outer surfaces of the work. The contact between the aluminum sheets constitutes a higher resistance than the contact between the copper tip and the aluminum, and more heat is therefore generated at the sheet-to-sheet contact than at the tip-to-sheet contact, the heat generated varying with the resistance.

However, the resistance of the sheet-to-sheet contact of aluminum is very low, usually varying in practice from three to one hundred microhms, depending upon the type, degree, and quality of the cleaning, and a few microhms variation may make a substantial difference in the resulting spotwelds. This is because the welding machine controls are of necessity set to produce the optimum results with a definite resistance of the work surfaces.

As an example, if some of the work is cleaned so as to have six microhms resistance at the faying surfaces and the machine is set to produce the desired quality of welds at this resistance, a weld made at a point which actually had twelve microhms resistance, only six microhms higher, would be too hot and would probably be cracked, as the resistance at that point was 100% higher than the resistance for which the machine controls were set, and more heat would therefore be generated in this spot. Also, if a weld were then made at a point where the resistance was only three microhms, not enough heat would be generated to give a weld of full strength. Higher resistance work will reduce the current somewhat, but the heat generated in the higher resistance will be still greater. When the test current flows, a higher resistance work piece will reduce the magnitude of this current also, but the voltage drop across the higher resistance will be greater, and it is this greater voltage drop which is utilized to reduce the welding energy for the weld at such high resistance point.

So, because no method of surface preparation has yet been perfected which will assure absolute uniformity of resistance from spot to spot, consistency in spotweld quality, (when checked by the modern methods of shear strength, nugget penetration, grain structure, X-ray examination of the interior, etc.) is not possible to the degree desired for such critical structures as aircraft.

Also, in making a row of spots, a certain portion of the welding current naturally by-passes or shunts around thru previously made adjacent welds, and this has the undesirable effect of reducing the amount of heat developed in the weld then being made.

The method herein described aims to overcome this difficulty, at least in part, by measuring the resistance of the joint to be welded, after normal welding pressure has been applied by the welding electrodes, and adjusting the setting of the energy controls to conform to that resistance, and then, without disturbing the welding tips in their position under pressure on the work, discharging the corrected value of welding energy thru the joint to complete the weld. In other words, the machine setting is adjusted for each individual weld, in accordance with the relative resistance of the work at the point where the weld is to be made.

It is obvious that a number of different ways of practicing such a method are available, from manual control to fully automatic devices, and several are described herein.

Also, it is a well-known fact that when welding steel or other ferrous materials, more or less of this material is necessarily positioned within the throat of the machine, and this acts to increase the impedance of the secondary circuit of the welding transformer and this in turn reduces the current which will flow, the reduction varying with the amount of the ferrous material within the throat.

Therefore, the secondary current will vary as such work is rotated or otherwise moved when welding different parts of the assembly. This is often a serious disadvantage in welding ferrous materials.

By using the method here disclosed, when the secondary current is reduced by more ferrous material being moved into the throat, a test current detects this and correspondingly increases the energy input to the welder to compensate for the effect of the ferrous material. This action takes place during each individual weld cycle.

In the drawings—

Fig. 1 shows a conventional voltage control circuit as now used in some capacitor-type stored energy machines using a negative bias on the grid of an electronic control tube to determine the voltage to which the main capacitor bank will be charged.

Fig. 2 shows how an external correcting bias may be introduced to the grid of the control tube of Fig. 1 to change the regular bias.

Fig. 3 shows an alternate method of applying the correcting bias to the grid of the control tube, by introducing it directly across the control tube grid resistor. This figure also shows how the correcting bias may be made proportional to the resistance of the work about to be welded, by sending a test current thru the work to measure the resistance thereof. This figure also illustrates the most obvious manner of applying this test current to the work by introducing an A. C. voltage of proper amplitude to the primary of the welding transformer.

In stored energy machines of the capacitor type, the total energy to make each weld is stored in a bank of capacitors and remains fixed, awaiting the will of the operator to discharge this energy into the weld. The amount of energy to be used in each weld is determined mainly by the voltage to which the main capacitor bank has been charged, the energy stored varying as the square of this voltage. In the circuit of Fig. 1, this voltage is selected by setting the slider of potentiometer Pot. 1. This slider selects a desired portion of the 200 volt fixed bias supply B—1, G to 3, and applies it to the grid of tube 3 as a negative hold-off bias, G to 2, which normally prevents tube 3 from firing.

A separate 460 volt fixed fixed bias supply B—2, 5 to 6, impresses a positive bias, 7 to 6, on the grid of tube 1. Tube 1 fires to charge the main capacitor bank C from the step-up transformer T—1, two legs of a three-phase secondary only being shown. As the voltage builds up on C, a voltage also builds up 4 to G which opposes and finally overcomes the negative bias, G to 2, and allows tube 3 to fire, and this tube 3 current flowing thru resistor R4 opposes and finally overcomes the positive bias, 7 to 6, to stop tube 1. Thus the point in the voltage rise on capacitor C at which tube 3 will fire and stop tube 1, depends upon the value of the bias voltage, G to 2, which is selected by the slider of Pot. 1.

This setting of the slider of Pot. 1 is usually made by the machine operator when setting up the machine controls for a certain combination of work gages and work surface resistance conditions, and is left at that setting thru a run of many welds. Therefore, any variation of the surface resistance conditions at the different spot locations will result in a substantial difference in the amount of heat generated in the individual welds, and of course in the quality and strength thereof.

The circuit of Fig. 2 shows how an external bias may be introduced to the grid of tube 3, G to 2, to change the fixed bias already set by the slider of Pot. 1, and thereby change the voltage on the capacitor bank. An auxiliary bias supply B—1—A is substantially a duplicate of the regular bias supply B—1 except that B—1—A supplies a voltage about 20 volts higher than B—1. The slider of Pot. 1—A is on the same shaft and turns with the slider of Pot. 1, but because the fixed voltage across the supply to Pot. 1—A is somewhat higher than the voltage across the supply to Pot. 1, for any setting of the two sliders the voltage G to 2—A is always greater, by a predetermined amount, than the voltage G to 2. The resistance of Pot. 1—A may be tapered around its length to provide a more accurate relation to the effect of Pot. 1 over the entire voltage range.

If the slider of Pot. 1 is adjusted to give about 60 volts, G to 2, the main capacitor bank will charge up to about 1000 volts. If this setting of the sliders gives 75 volts, G to 2—A, and this 75 volts is then applied to the grid circuit of tube 3, G to 2, by means of switch CR3, this 15 volt higher negative voltage will cut off tube 3 and thus allow tube 1 to fire again and will increase the voltage on the capacitor bank about 150 volts, to 1150. This range of 150 volts on the main capacitor bank is approximately what is required to take care of the usual variations in work surface conditions.

An alternate and preferred method of applying a corrective bias to the grid of tube 3, by introducing it directly across the grid resistor R3, is shown in Fig. 3. Here the application of 12 to 13 volts of proper polarity will be sufficient to raise the voltage of the capacitor bank the desired 150 volts. This figure also shows how the correcting bias may be made proportional to the resistance of the work about to be welded. This is accomplished by passing a relatively small test current, in this case 500 to 1000 amperes, thru the work by means of the welding tips, after normal welding pressure has been applied to the work thereby, and using the resulting voltage drop across the work as a signal to vary the correcting bias applied to the grid of tube 3. This voltage drop is substantially a measure of the resistance of the work between the tips, under the exact conditions which will exist when the weld is started.

This figure also illustrates the most obvious manner of applying this test current to the work, by introducing through switch CR1 an AC voltage from source S of proper amplitude, about 120 volts, to the primary of the welding transformer T—2 for a brief period after the electrode tips have been pressed onto the work under substantially normal welding pressure. Switches CR1, CR2, and CR4 are closed only to connect the test-current source S to T—2 and the grid of tube 3 to change the voltage on C when necessary. Switch CR5 is closed only to discharge the main capacitor bank C into the primary of the welding transformer T—2 to make the weld. Switch CR5 is always open when CR1, CR2, and CR4 are closed, and CR1, 2, and 4, are always open when CR5 is closed, so as to protect the test circuit.

If a test current of 1000 amperes is sent thru the work, the resulting voltage drop across the work will be at the rate of 1 millivolt per microhm of resistance. As the resistance from tip to tip thru the work, in practice, will be from 30 to 200 michroms, 30 to 200 millivolts drop will be available as a signal voltage to adjust the voltage on the main capacitor bank, with which the weld will be made.

This signal is amplified and used to control the value of the correcting bias voltage, either the 220 volts of B—1—A of Fig. 2, or the 13 volts of 8 to 9 of Fig. 3. These voltages may be increased or decreased as desired when a wider or narrower range of correction is needed.

The amplification of this signal and its application to the control of the correcting vias voltage presents no particular difficulties and a number of circuits suitable therefor are obvious to one skilled in the art.

A variation of the above would be to send an external D. C. current thru the work to produce the signal, but only about half of this would be effective to produce the drop across the work as the balance would shunt around thru the secondary of the transformer which is of very low resistance.

Operation

In operating a condenser-type stored energy machine under this process, the machine controls will be set to give the desired results on samples of minimum resistance, such as three microhms at the faying surfaces, without the use of a correcting bias. Assuming that this setting requires 1800 volts on the capacitor bank, the slider of Pot. 1 is then turned back so as to give about 150 volts less, or only 1650 volts, on the capacitor bank. This is now the voltage to which the capacitor bank will automatically charge after each weld.

Then, when work pieces having the same low resistance as the sample are placed between the tips, the voltage drop from the test current will be low and will act to reduce the value of the correcting bias (G to 2—A of Fig. 2, or 8 to 9 of Fig. 3) very little, if any, and this full correcting bias, when applied to the grid of tube 3, will increase the voltage on the capacitor bank substantially the full 150 volts to the optimum setting of 1800 volts previously determined as needed for the sample.

If next a piece is to be welded which has a high faying surface resistance, such as 200 microhms, a considerably greater voltage drop will result when the test current is sent thru it, and this increased signal will reduce the correcting bias voltage almost to zero, and when this near zero correcting bias is applied to the grid of tube 3, the capacitor bank voltage will be increased little if any, and will remain at, or near 1650 volts. This reduced energy is what is required to prevent overheating this high resistance spot.

In between these extremes a moderately high resistance work contact will give an intermediate voltage drop and correcting bias, and the capacitor bank voltage will be increased in proportion, say to 1725 volts. Thus the voltage of the capacitor bank, and thereby the energy put into the weld, will always be maintained low enough to properly weld high resistance spots and will be proportionally increased for each spot of lower resistance.

It should be obvious that the range of capacitor bank voltage thru which the method operates may be varied at will by proper adjustments of the various circuits or components. Actual tests have shown that a strip of work having almost every degree of surface resistance along its length, from three microhms to 300 microhms, has been satisfactorily welded by this method on the one manual setting of the controls, every weld being sound and without spitting or burning, and free from internal cracks as shown by X-ray examination. It is considered possible that production welding of aluminum may now be done with no cleaning of the surfaces except degreasing, and, as the cleaning of the material has up till now been a major problem, the advantages of the herein disclosed method are evident.

While I have described the details of using this method with capacitor-type stored energy machines, it is equally applicable to other machine types. Similar steps may be taken to use a test signal to vary the phase-shift control of the welding heat as now widely used on straight A. C. machines, and the method may be used with the magnetic-type stored energy machines by using the voltage drop, possibly from the preheat current, to prolong the charging time beyond the moment the maximum current relay operates, so as to increase the energy for that particular weld.

What I claim is:

1. The method of electric resistance welding which consists of—pressing the welding electrodes onto the work with normal welding pressure at the point to be welded; measuring the electrical resistance of the path thru the work thus formed, to determine the relation thereof to a preselected resistance value; and then passing the necessary welding current thru the work, the total energy of said current having been adjusted in conformity with the relation of the determined resistance to the preselected resistance, whereby the heat input to each weld is substantially equal.

2. The method of electrical resistance welding which consists of—pressing the welding electrodes onto the work with normal welding pressure at the point to be welded; measuring the electrical resistance of the path thru the work thus provided, to determine its relation to a preselected standard; adjusting the energy to be used in making the weld in accordance with the said determined resistance and its relation to the standard; and, without removing the electrode pressure from the work, passing the adjusted welding energy thru the work in the usual manner to complete the weld.

3. The method of electric resistance welding with a capacitor-type stored energy machine having a main capacitor bank and a pair of electrodes which consists of—charging the main capacitor bank to a voltage somewhat lower than would normally be used for the work to be welded when that work has a surface resistance of a preselected standard value; pressing the welding electrodes onto the work with normal welding pressure at the point to be welded; measuring the electrical resistance of the path thru the work thus provided, to determine any deviation thereof from the said standard; selectively increasing the voltage on the main capacitor bank to compensate for any such deviation; and then passing the thus adjusted energy of the capacitor bank thru the work in the normal manner to complete the weld.

4. The method of electric resistance welding with capacitor-type stored energy machines such as are equipped with a main capacitor bank and a pair of welding electrodes, which consists of—charging the main capacitor bank to a voltage somewhat lower than would normally be used for the work to be welded; pressing the welding electrodes onto the work with normal welding pressure at the point to be welded; passing momentarily a relatively small test current thru the work by means of the electrodes to ascertain the electrical resistance of the joint to be welded and its relation to a preselected standard; increasing the voltage on the capacitor bank in accordance with the resistance indicated and its relation to the standard; and passing the thus adjusted energy of the capacitor bank thru the work in the normal manner to complete the weld, whereby the heat input to each weld is made substantially uniform regardless of work resistance variations.

5. The method of electric resistance welding of ferrous materials by means of a welding circuit including a welding transformer and a pair of electrodes, which consists of—pressing the welding electrodes onto the work with normal welding pressure and with the work pieces in welding position; passing an A. C. test current thru the welding transformer, the electrodes and the work, to determine the impedance of the welding circuit including the work as compared to a preselected standard value of impedance; adjusting the welding energy to be used in making the weld in accordance with any deviation of the indicated impedance from the preselected standard and passing the adjusted welding energy thru the work to complete the weld, whereby the heat input to each weld is substantially the same regardless of any change in impedance caused by shifting the work in the machine.

6. That method of electric resistance welding which consists of—pressing the welding electrodes onto the work under normal welding pressure at the point to be welded; passing a relatively small test current thru the work from electrode to electrode to determine the relative resistance of the contact between the work pieces under the exact conditions which will obtain when the weld current starts; adjusting the energy to be used in making the weld in accordance with any deviation of the said contact resistance from a preselected standard so as to produce the desired heat in the weld area; and then, without removing the electrode pressure from the work, passing the adjusted energy thru the work to complete the weld.

7. The method of electric resistance welding which consists of—pressing the welding electrodes onto the work with normal welding pressure and with the work pieces in welding position; passing a relatively small test current thru the work by means of the electrodes to determine the resistance of the contact between the work pieces at the point to be welded; and passing a welding current thru the work to complete the weld, the total energy of such welding current having been adjusted in accordance with any deviation of the determined resistance of the said work pieces contact from a preselected resistance standard, so as to produce consistently equal heat input to each weld as the resistances of the said contacts vary from one spot to the next.

8. In electric resistance welding, the method of compensating for variations in the surface resistance conditions of the work pieces, which consists of—pressing the welding electrodes onto the work under normal welding pressure at the point to be welded; passing a relatively small test current thru the work by means of the electrodes to determine the resistance of the work surfaces contact at the point to be welded, with reference to a preselected standard resistance; adjusting the welding energy to be used to make the weld in accordance with any deviation of the said determined resistance from the said standard; and then passing the adjusted welding energy thru the work to complete the weld, whereby to obtain substantially equal heat input to each and every weld.

9. The method of electric resistance welding of ferrous materials by means of a welding circuit including a welding transformer, and a pair of electrodes, said method being designed to compensate for the changes in the impedance of the welding circuit caused by moving said ferrous materials in and out of the throat of the welder as the welding progresses to different parts of the work, which consists of—clamping the work pieces in welding position between the welding electrodes under normal welding pressure at the point to be welded; passing momentarily a relatively small A. C. test current thru the welding transformer and the work by means of the welding electrodes to produce a voltage drop across the work, said test current and voltage drop being responsive to any changes in the impedance of the welding circuit from a preselected impedance standard; adjusting the energy input to the welding circuit to compensate for any change in impedance indicated by the value of the said voltage drop; and then, without removing the electrode pressure from the work, passing the adjusted welding energy thru the work to complete the weld.

10. The method of electric resistance welding of ferrous materials with a conventional welding machine which includes a welding transformer and a pair of electrodes connected thereto to comprise a welding circuit, which method consists of—pressing the welding electrodes onto the work with normal welding pressure and with the work in welding position; passing a suitable test current thru the welding circuit and the work to determine the relative impedance of the welding circuit including the work; adjusting the welding energy to be used in making the weld in accordance with any deviation of the determined impedance from a preselected impedance standard; and passing the thus adjusted welding energy thru the work to complete the weld.

11. In electric resistance welding, the method of compensating for variations in the impedance of the welding circuit when magnetic materials are introduced into, or shifted within, the throat of the welding machine, which method consists of—pressing the welding electrodes onto the work under normal welding pressure and with the work pieces in welding position; passing a suitable test current thru the welding circuit and the work by means of the electrodes to determine the impedance of the welding circuit including the work, with reference to a preselected standard impedance; adjusting the welding energy to be used to make the weld in accordance with any deviation of the said determined impedance from the said standard; and then passing the adjusted welding energy thru the work to complete the weld, whereby to obtain substantially equal heat input to each and every weld.

JESSE J. BROWN.

REFERENCES CITED

The following references are of record in the file of this patent:

UNITED STATES PATENTS

| Number | Name | Date |
|---|---|---|
| 1,933,937 | Schnetzer | Nov. 7, 1933 |
| 1,975,997 | Whitesell | Oct. 9, 1934 |
| 1,991,414 | Rees | Feb. 19, 1935 |
| 2,024,542 | Simon | Dec. 17, 1935 |
| 2,081,124 | Vicario | May 18, 1937 |
| 2,371,636 | McConnell | Mar. 20, 1945 |

OTHER REFERENCES

"Welding Handbook" (1942), pages 270 and 271. American Welding Society, 33 West 39th Street, New York, New York.